No. 675,915. Patented June 11, 1901.
E. D. WOODS.
WHEEL.
(Application filed Oct. 21, 1899. Renewed Mar. 1, 1901.)
(No Model.)
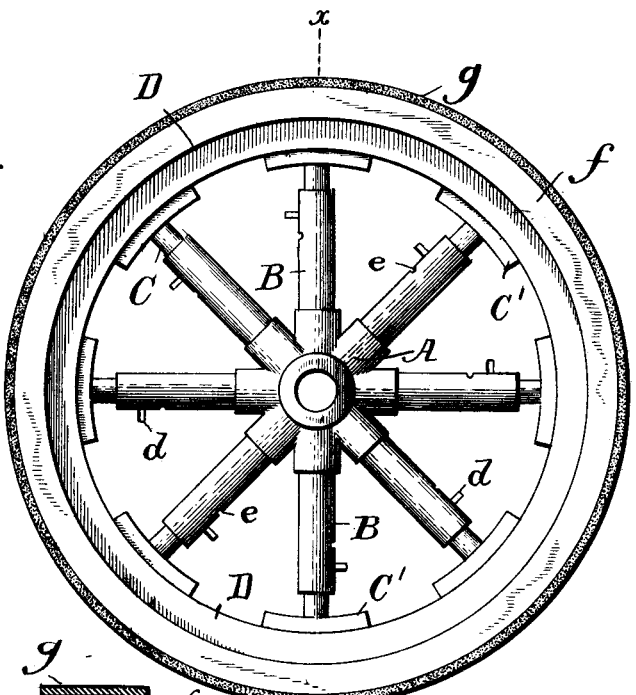
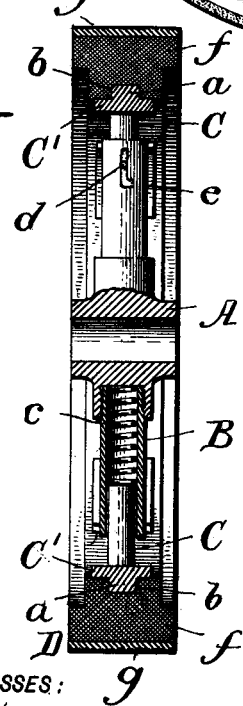
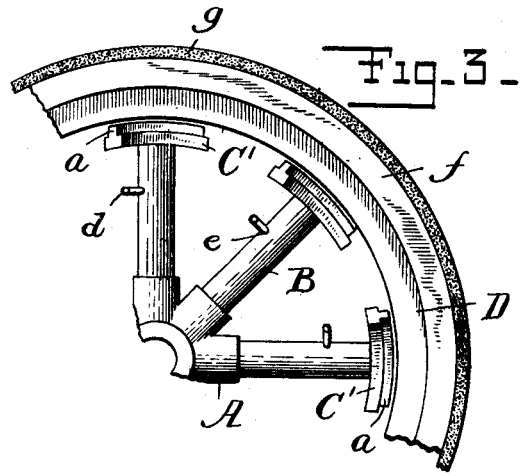
WITNESSES:
F. N. Roehrich
Eugene W. Small
INVENTOR
Edward D. Woods,
BY
Wm. B. Whitney,
ATTORNEY

UNITED STATES PATENT OFFICE.

EDWARD D. WOODS, OF NEWARK, NEW JERSEY, ASSIGNOR OF ONE-HALF TO WALTER L. CLARK.

WHEEL.

SPECIFICATION forming part of Letters Patent No. 675,915, dated June 11, 1901.

Application filed October 21, 1899. Renewed March 1, 1901. Serial No. 49,490. (No model.)

*To all whom it may concern:*

Be it known that I, EDWARD D. WOODS, a citizen of the United States, residing at Newark, in the county of Essex and State of New Jersey, have invented certain new and useful Improvements in Wheels, of which the following is a specification.

My invention relates especially to that class of wheels which are used for polishing, finishing, or other similar purpose, and has for one object to provide for the automatic adjustment and tightening of the rim of the wheel when in motion, by which a smooth and yielding or cushioned working surface is obtained.

A second object is to provide for the easy removal and replacement of the rims, so as to render them readily interchangeable.

I obtain these objects by the mechanism illustrated in the accompanying drawings, in which—

Figure 1 is a side elevation; Fig 2, a section looking from the left on the line $x\,x$ of Fig. 1; and Fig. 3, a broken sector of the wheel, showing the sliding arm extensions drawn back and locked in position for the removal of the rim.

Similar letters refer to similar parts throughout the several views.

Attached to the hub A or made integral therewith are hollow radial arms B, in which slide rods C, forming longitudinally-movable extensions thereof. At the outer ends of these sliding arm extensions are curved headpieces C', provided along their outer surfaces with tongues $a$, which fit into an annular groove $b$ around the inner circumference of the rim D. These curved headpieces form somewhat-extended bearing-surfaces for the rim, and the height of their tongues and the depth of the groove around the rim are preferably the same.

The curved headpieces may be secured to the rim by screws, bolts, or other suitable means, if desired, and in this case the tongues and groove may be omitted; but there is no advantage in such a connection, and the second object of my invention as above specified is thereby defeated.

Springs $c$, placed in the hollow arms, serve to press the sliding arm extensions outwardly and so keep the bearing-heads in contact with the rim and hold the rim concentric with the hub when the wheel is not in motion, and pins $d$, carried by the sliding arm extensions and working in elbowed slots $e$ in the sides of the arms (see Fig. 2) limit the outward movement of the sliding arm extensions when the rim is removed and furnish means for pushing them back into the arms and there locking them in position for the removal and replacement of the rim, as shown in Fig. 3.

The rim may be made of any suitable and, if desired, homogeneous material. I prefer, however, to make it, as shown in the drawings, of an outer band $g$ of leather or other suitable material, with an inner backing or cushion $f$ of somewhat yielding or elastic material, as prepared felt or rubber, for example. A polishing, finishing, or other desired surface may be applied to the outer band in any suitable manner.

When the wheel is put in motion, the sliding arm extensions are thrown outwardly by the action of centrifugal force and automatically adjust or center the wheel, while the bearing-heads carried thereon compress the inner backing or cushion and tighten the outer band of the rim, thereby furnishing a smooth and at the same time elastic and yielding working surface.

I do not limit myself to the specific parts or connections of parts illustrated and described herein and especially to the details of the sliding connections between the two parts of the radial arms, as it is obvious that the same may be variously modified without departing from the spirit of my invention.

What I claim as new, and desire to secure by Letters Patent, is—

1. In a wheel, the combination of a hub, radial arms with sliding arm extensions which are free to be thrown outwardly against the rim by the action of centrifugal force, and a rim consisting of an endless band which acts as a stop to the outward movement of the sliding arm extensions and is detachably connected therewith, for the purpose set forth.

2. In a wheel, the combination of a hub, radial arms with sliding extensions which are free to be thrown outwardly against the rim by the action of centrifugal force and are limited in such outward movement only by the resistance of the rim, and a rim consisting of an endless outer band with an inner elastic backing detachably connected with the sliding arm extensions, for the purpose set forth.

3. In a wheel, the combination, with a hub and rim, of radial arms fixed with reference to the hub and having sliding arm extensions which are normally held in supporting-contact with and are free to be thrown outwardly against the rim by the action of centrifugal force, and means for withdrawing said arm extensions from and locking them out of contact with the rim, for the purpose set forth.

4. In a wheel, the combination of a hub, radial arms composed of two parts, an inner fixed and an outer sliding part, curved bearing-heads provided with tongues on said sliding parts, and a rim with an annular groove around its inner circumference into which fit the tongues along the outer surfaces of said bearing-heads, for the purpose set forth.

5. In a wheel, the combination of a hub, radial arms composed of two parts, an inner fixed and an outer sliding part, curved bearing-heads on said sliding parts, and a rim consisting of an outer band and an inner elastic backing provided with an annular groove around its inner circumference into which fit tongues along the outer surfaces of said bearing-heads, for the purpose set forth.

6. In a wheel, the combination of a hub, radial arms composed of two parts, an inner fixed and an outer sliding part, curved bearing-heads on said sliding parts, a rim with an annular groove around its inner circumference into which fit tongues along the outer surfaces of said bearing-heads, and means for drawing the sliding parts back within or along the fixed parts of the radial arms and locking them in position for the removal of the rim.

7. In a wheel, the combination, with a hub and rim, of radial arms composed of two parts, an inner fixed and an outer sliding part which is outwardly spring-pressed and normally free to be thrown outwardly by the action of centrifugal force against the rim, and means for withdrawing said sliding arm parts from and locking them out of contact with the rim, for the purpose set forth.

8. In a wheel, a rim composed of an outer band and an inner elastic backing provided with an annular groove around its inner circumference, in combination with a hub and radially-expansible arms having bearing-heads adapted to fit into said annular groove, for the purpose set forth.

9. In a wheel, a rim composed of an outer band of leather and an inner elastic backing provided with an annular groove around its inner circumference, in combination with a hub and radially-expansible arms having bearing-heads adapted to fit into said annular groove, for the purpose set forth.

10. In a wheel, a rim composed of an outer band of leather and an inner backing of felt provided with an annular groove around its inner circumference, in combination with a hub and radially-expansible arms with bearing-heads adapted to fit into said annular groove, for the purpose set forth.

11. In a wheel, the combination of a hub A, radial arms B, sliding arm extensions C with curved bearing-heads C' provided with tongues $a$, rim D provided with groove $b$, springs $c$, and pins $d$ working in elbowed slots $e$, for the purpose set forth.

EDWARD D. WOODS.

Witnesses:
RALPH S. ROUNDS,
WM. B. WHITNEY.